(12) United States Patent
N et al.

(10) Patent No.: US 12,524,274 B2
(45) Date of Patent: Jan. 13, 2026

(54) METHOD AND SYSTEM FOR PREDICTING OPTIMAL CONFIGURATION PARAMETERS FOR A DATA ANALYTICS ENGINE

(71) Applicant: LTI Mindtree Ltd, Mumbai (IN)

(72) Inventors: Sarvesh N, Coimbatore (IN); Sudhir Kumar Kakumanu, Hyderabad (IN)

(73) Assignee: LTI Mindtree Ltd, Mumbai (IN)

( * ) Notice: Subject to any disclaimer, the term of this patent is extended or adjusted under 35 U.S.C. 154(b) by 703 days.

(21) Appl. No.: 17/889,742

(22) Filed: Aug. 17, 2022

(65) Prior Publication Data

US 2023/0409402 A1 Dec. 21, 2023

(30) Foreign Application Priority Data

Jun. 17, 2022 (IN) .............................. 202221034676

(51) Int. Cl.
*G06F 9/44* (2018.01)
*G06F 9/50* (2006.01)
*G06F 11/34* (2006.01)

(52) U.S. Cl.
CPC .......... *G06F 9/5038* (2013.01); *G06F 9/5072* (2013.01); *G06F 11/3409* (2013.01); *G06F 2209/505* (2013.01)

(58) Field of Classification Search
CPC .................................................... G06F 9/5038
USPC ......................................................... 718/104
See application file for complete search history.

(56) References Cited

U.S. PATENT DOCUMENTS

| | | | |
|---|---|---|---|
| 9,418,337 B1 * | 8/2016 | Elser .................. | G06F 16/2468 |
| 2015/0339572 A1 * | 11/2015 | Achin ..................... | G06N 5/04 |
| | | | 706/46 |
| 2018/0159727 A1 * | 6/2018 | Liu ....................... | H04L 41/147 |
| 2019/0245757 A1 * | 8/2019 | Meyer ................. | G06F 9/45558 |
| 2022/0035677 A1 * | 2/2022 | Del Pino Ruiz ....... | G06Q 50/00 |

* cited by examiner

*Primary Examiner* — Timothy A Mudrick
(74) *Attorney, Agent, or Firm* — CHIP LAW GROUP

(57) ABSTRACT

The invention relates to a method and system for predicting optimal configuration parameters for a data analytics engine. The method and system utilizes Supervised Machine Learning (ML) techniques for predicting optimal configuration parameters for the data analytics engine to run a specific application in a given time frame, wherein the optimal configuration includes estimating an optimal number of executor instances in real-time. The invention analyzes input parameters such as data metrics, software metrics, and hardware metrics to determine if the input parameters comprise a new dataset or a continuous dataset and deploy one or more models such as a Forecasting Model and a Regression Model. The one or more models then derive and allocate the possible number of executor instances. The executor instances allocated can be a number of executors, executor cores, the memory of executors, driver memory, and parallelism.

14 Claims, 5 Drawing Sheets

SARIMAX Results

| Dep. Variable: | y | No. Observations: | 320 |
|---|---|---|---|
| Model: | SARIMAX(0, 1, 1) | Log Likelihood | -690.178 |
| Date: | Tue, 10 May 2022 | AIC | 1392.356 |
| Time: | 11:10:07 | BIC | 1414.947 |
| Sample: | 0 | HQIC | 1401.378 |
|  | - 320 |  |  |

Covariance Type: opg

|  | coef | std err | z | P>\|z\| | [0.025 | 0.975] |
|---|---|---|---|---|---|---|
| num_rows | 0.0001 | 5.32e-05 | 2.324 | 0.020 | 1.94e-05 | 0.000 |
| numerical_cols | 0.9820 | 0.520 | 1.888 | 0.062 | -0.049 | 2.014 |
| driver_memory | 0.0002 | 0.044 | 0.004 | 0.997 | -0.086 | 0.086 |
| data_size | -0.7027 | 0.305 | -2.305 | 0.021 | -1.300 | -0.105 |
| ma.L1 | -0.5886 | 0.052 | -11.270 | 0.000 | -0.691 | -0.486 |
| sigma2 | 4.6599 | 0.424 | 10.984 | 0.000 | 3.828 | 5.490 |

| Ljung-Box (L1) (Q): | 1.22 | Jarque-Bera (JB): | 1.93 |
|---|---|---|---|
| Prob(Q): | 0.27 | Prob(JB): | 0.38 |
| Heteroskedasticity (H): | 0.44 | Skew: | 0.12 |
| Prob(H) (two-sided): | 0.00 | Kurtosis: | 3.30 |

FIG. 3

METHOD AND SYSTEM FOR PREDICTING OPTIMAL CONFIGURATION PARAMETERS FOR A DATA ANALYTICS ENGINE

TECHNICAL FIELD OF THE INVENTION

The present invention generally relates to a data analytics engine. More particularly, the invention relates to predicting optimal configuration parameters for the data analytics engine.

BACKGROUND OF THE INVENTION

At present, data is considered a crucial element worldwide. From the largest technology companies to small startups across different industries are desiring to build applications using vast amounts of data generated worldwide. Data ranges from various real-time sensor data to activity logs of users, user profiles on social media platforms, or customers' data in banks. Petabytes of such data are generated all over the world daily.

Similarly, an increase in smartphone usage, social media applications, and search engines, to name a few, have contributed to an enormous explosion in data growth. The volume of data created worldwide is growing exponentially every day. Such enterprise-size data sets are known as Big Data, and analyses of the Big Data to derive meaningful information require leading-edge hardware and software.

At a hardware layer, architectural techniques such as Simultaneous Multithreading (SMT) and prefetch are used to improve overall system performance. At a software layer, for example, Apache Spark™ by the Apache Software Foundation is one of the most popular large-scale data analytics frameworks. However, deriving desired performance from Apache Spark™ requires in-depth knowledge to appropriately set the hardware parameters such as SMT and prefetch settings.

While the performance delivered by existing data analytics engines or platforms has enabled data scientists and engineers to solve complex problems and analysis on big and complex data in actionable timeframes, the process of manually configuring underlying jobs by allotting a number of executors can be difficult and time-consuming. This configuration process is heavily based on repeated trial-and-error. Still, it also requires the developer to have a low-level understanding of the data analytics engine and detailed cluster sizing information.

An existing method for optimizing the hardware settings to adjust software applications such as Spark™ is, exhausted searching. For example, the SMT mode can be set to SMT mode (1 thread per core), SMT2 mode (2 threads per core), or SMT4 mode (4 threads per core) when running benchmark jobs with differing system states. The SMT setting associated with the best benchmark job is recorded, and when a new job is allotted, it is mapped to a similar benchmark, which involves huge cost, time, and effort.

Another method, for example, the static configuration method, runs a Spark™ job multiple times, with the SMT set to a different setting each time. For instance, assume a job runs three times, with the SMT set to 1, 4, and 8 threads per core. After all, three runs of the same job, the data is analyzed to determine which SMT configuration yielded the best results, then that configuration is selected for future jobs.

All those mentioned above, and other existing methods fail to focus on providing and adjusting the right-sized configuration of a particular application in a data analytics engine using Supervised Machine Learning (ML) algorithms. Also, the existing methods fail to efficiently manage and organize configuration parameters of a data analytics engine, such as, for example, a number of executors, cores, executor memory, etc.

Therefore, the need exists to put forward a methodology to provide the best possible configuration parameters for a data analytics engine to run applications most efficiently in a given time frame.

SUMMARY OF THE INVENTION

The invention discloses a method and system for predicting optimal configuration parameters for a data analytics engine using Supervised Machine Learning (ML). Predicting the optimal configuration includes estimating an optimal number of executor instances in real-time for the data analytics engine.

One or more advantages of the prior art are overcome, and additional advantages are provided through the invention. Additional features are realized through the techniques of the invention. Other embodiments and aspects of the disclosure are described in detail herein and are considered a part of the invention.

BRIEF DESCRIPTION OF THE FIGURES

The accompanying figures where like reference numerals refer to identical or functionally similar elements throughout the separate views and which together with the detailed description below are incorporated in and form part of the specification, serve to further illustrate various embodiments and to explain various principles and advantages all in accordance with the invention.

FIG. 3 is a table that illustrates experimental results representing performance of SARIMAX model, in accordance with an exemplary embodiment of the invention.

Figure 1:
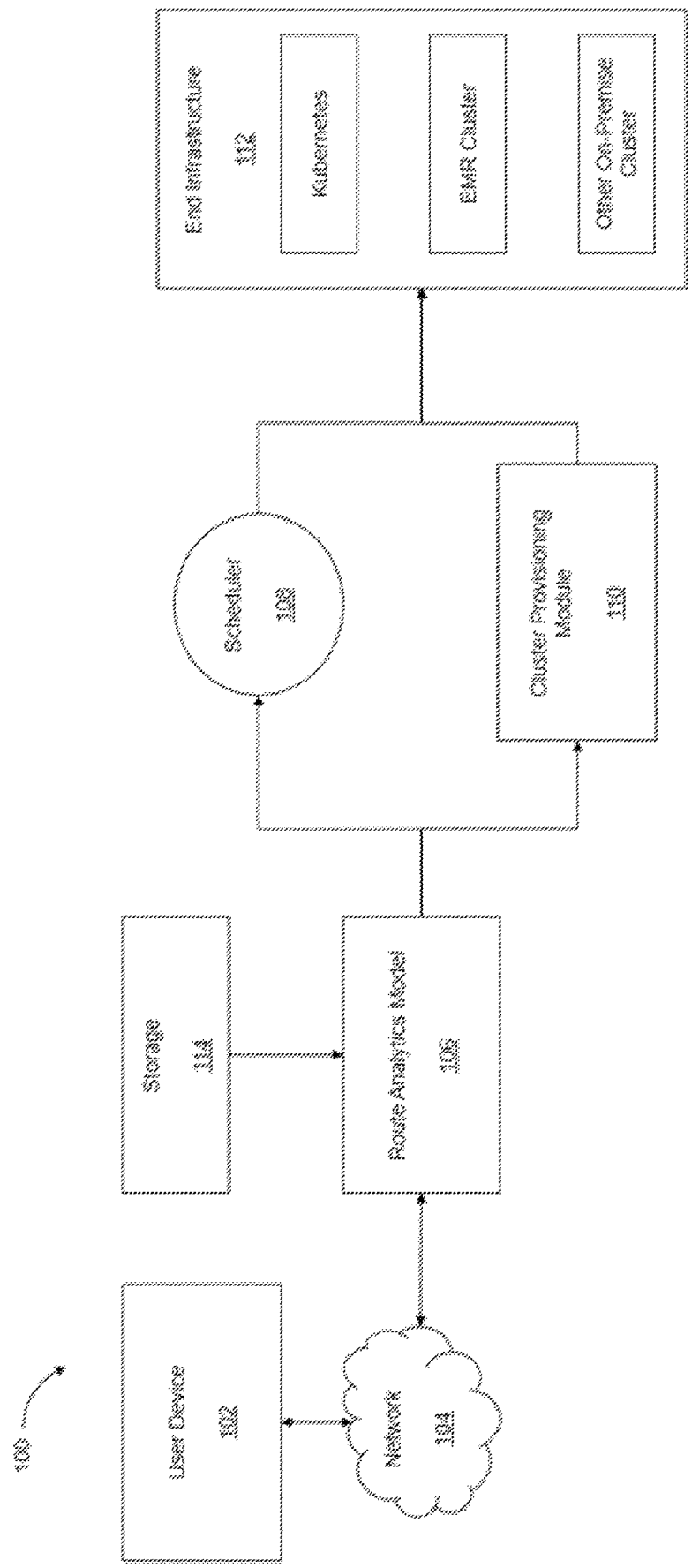
FIG. 1 is a diagram that illustrates an environment in which various embodiments of the invention may function.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF THE INVENTION

Before describing in detail embodiments that are in accordance with the present invention, it should be observed that the embodiments reside primarily in combinations of method steps and components related to a method and system for predicting optimal configuration parameters for a data analytics engine using Supervised Machine Learning (ML) algorithms. Accordingly, the system components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Generally speaking, pursuant to various embodiments, the invention provides the possible configuration parameters for the data analytics engine to run a specific application in a given time frame. The invention analyzes one or more input parameters such as data metrics, software metrics, and hardware metrics to determine if the input parameters comprise a new dataset or a continuous dataset. One or more models from a plurality of models are deployed upon determining the input parameters. The plurality of models includes models such as a Forecasting Model or a Regression Model.

The one or more models are trained using Supervised Machine Learning (ML) algorithms such as, but not limited to, a Linear Regression algorithm, a Ridge Regression algorithm, an XG Boost algorithm, or a Forecasting algorithm, which can be a Seasonal Auto-Regressive Integrated Moving Average with eXogenous factor (SARIMAX).

The one or more models then derive and allocate the possible number of executor instances for building optimal configuration parameters for the data analytics engine to run the specific application in the given time frame. The executor instances that are allocated can be such as but are not limited to the number of executors, executor cores, the memory of executors, driver memory, and parallelism.

The executors provide in-memory storage for Resilient Distributed Dataset (RDD) of the data analytics engine and are also configured to register themselves with drivers of the data analytics engine. The drivers of the data analytics engine comprise all the information about the executors at all the times. The executors act as worker nodes of the data analytics engine, which take charge and run individual tasks in the given job in response to the user query. The executors are triggered and launched at the start of the job execution and they typically run for the entire lifetime of the job.

In an embodiment, the number of allocated executors can be referred to as a number of worker nodes that help to process by being in charge of individual tasks in a given application. The executors are launched at the start of the application. They are typically run for the entire lifetime of the application. The number of executors is allocated based on a Formula as stated below in Equation (1):

$$\sqrt{\frac{Max(500, rows * clos * 16 * DATAMULTIPLIER)}{1024 * 1024}} \quad (1)$$
$$\overline{PARTITION\ SIZE}$$

Where,
rows=number of rows in the dataset
cols=number of columns in the dataset
DATAMULTIPLIER=4 (tackling OOM)
PARTITIONSIZE=128 (block size)

In accordance with an embodiment, the executor cores are allocated based on the experimentally set rule by taking available hardware into account. Predicting and allocating an optimal number of executor cores helps in the parallel execution of the application. However, too many cores per executor can lead to a large memory pool and reduced garbage collection leading to slow processing.

In accordance with an embodiment, the memory of executors is allocated based on the rule that is experimentally set by taking available hardware into account. Predicting and allocating executor memory depends on physical memory available in a node, and after considering the overhead factor and memory of the cluster manager.

In accordance with yet another exemplary embodiment, the driver memory is allocated based on the experimentally set rule by taking the available hardware into account. An optimum amount of memory is allocated to use for the driver process, i.e., where the application is initialized. Setting up too large a memory size would be a waste of resources as most of the processing is done on the executors' side, and the driver is responsible for coordination.

In accordance with an embodiment, the parallelism is allocated based on the formula 4*spark.executor.instances, wherein it is the default number of partitions in RDDs returned by transformations like join, reduceByKey, and parallelize when not set explicitly by the user.

The Forecast Model is deployed in scenarios when the input parameters are determined to comprise a continuous dataset. The continuous dataset can be an existing and evolving dataset with emerging trends in its data over a period of time. Whereas the Regression Model is deployed upon determining that the input parameters comprise a new dataset.

In an exemplary embodiment, the data analytics engine can be such as, but not limited to, Integrate™, Atlas™, ZOHO™ Analytics, Microsoft HDInsight™, Microsoft Azure™, Sky tree, Talend, Splice Machine, Apache Spark™, Plotly, Apache SAMOA™, Lumify, Elastic Search, R-Programming, and IBM SPSS Modeler™.

FIG. 1 is a diagram that illustrates an environment 100 in which various embodiments of the invention may function. Referring to FIG. 1, the environment 100 includes a user device 102, a network 104, a route analytics model 106, a scheduler 108, a cluster provisioning module 110, an end infrastructure 112, and a storage 114.

In an exemplary embodiment, the user device 102 can include a desktop personal computer, workstation, laptop, PDA, cell phone, any wireless access protocol (WAP) enabled device, or any other computing device capable of interfacing directly or indirectly to the Internet or other network connection. The user device typically runs an HTTP client, e.g., a browsing program, such as Microsoft's Internet Explorer browser, Netscape's Navigator browser, Opera's browser, or a WAP-enabled browser in the case of a cell phone, PDA, or other wireless devices, or the like, allowing the users (e.g., the subscriber of the multi-tenant or single-tenant database system) of the user device to access, process and view information, pages and applications available to it over a network.

The user device 102 may be implemented using any device capable of wired or wireless communication, including but not limited to a cellular telephone, computer, server, router, laptop, tablet, wearable device, watch appliance, or an automobile.

The user device 102 may receive inputs or queries from users in the form of natural language. The received signals are formatted in accordance with the wireless communication protocol expected by the user device 102. The received signal can be a backscatter signal, such as but not limited to a Bluetooth signal (e.g., such as an advertising packet), a Wi-Fi signal (e.g., such as a beacon frame), and a ZigBee signal. For example, the backscatter signal may be an IEEE 802.15.4 beacon frame.

In accordance with an embodiment, the user device 102 is communicatively coupled to the route analytics model 106 via the network 104. The network (104) is any network or combination of networks of devices that communicate with one another. For example, the network may be any one or any combination of a LAN (local area network), WAN (wide area network), telephone network, wireless network, point-to-point network, star network, token ring network, hub network, or other appropriate configuration. The user device may communicate via the network using TCP/IP and use other common Internet protocols to communicate at a higher network level, such as HTTP, FTP, AFS, WAP, etc.

The route analytics model 106 is communicatively coupled to the scheduler 108 and the cluster provisioning module 110. The end infrastructure 112 is an infrastructure where all jobs of the data analytics engine are run upon receiving job schedules by either the scheduler 108 or the cluster provisioning module 110.

The route analytics model 106 utilizes one or more Supervised ML algorithms which provide operations based on multiple trial-and-error methods and then trains the one or more models using several types of input data obtained over the multiple trials-and-errors. The route analytics model 106 performs one or more pre-processing steps before triggering the scheduler 108 and the cluster provisioning module 110. The route analytics model 106 initially gathers metadata information from the received input parameters, then analyzes to determine if the input parameters comprise a new or continuous dataset. Upon determining the datasets, one or more models are deployed to derive and allocate an optimum number of executor instances for building optimal configuration parameters for the data analytics engine.

In accordance with an embodiment, the scheduler 108, which runs as a persistent service, monitors all tasks and Direct Acrylic Graphs (DAGs) and triggers the task instances once their dependencies are complete. The scheduler 108 spins up a subprocess, which monitors and stays in sync with all the DAGs in its corresponding DAG directory. Once per minute, by default, the scheduler collects DAG parsing results and checks whether any active tasks can be triggered.

In an exemplary embodiment, the scheduler 108 can be an add-on, which gives complete flexibility to define and execute workflows. The scheduler 108 also allows database administrators to schedule and monitor database maintenance jobs such as backups. It enables application developers to create programs and program libraries that end users can use to create or monitor their jobs.

In accordance with an embodiment, the cluster provisioning module 110 receives a time series of past usage data, determines an upcoming usage data based at least in part on the time series of past usage data, and provisions the cluster according to the upcoming usage data. After the processing job is completed, a measurement is made as to how well the prediction for executor instances is stored and used to refine the next prediction. The cluster provisioning module 110 interacts with other systems using an interface. The cluster provisioning module 110 comprises a system for receiving a time series of previous usage data, determining upcoming usage data based at least in part on the time series of prior usage data, and provisioning executor instances according to the upcoming usage data.

In accordance with an embodiment, the end infrastructure 112 can be such as, but not limited to, Bigdata platforms, Hadoop™ Clusters, Elastic Map Reduce (EMR) clusters, Kubernetes, and other on-premise clusters. The end infrastructure 112 is an infrastructure where all jobs of the data analytics engine are run upon receiving job schedules by either the scheduler 108 or the cluster provisioning module 110.

After that, the one or more models utilized for deriving and allocating the possible number of executor instances are stored in a storage 114 for future usage and are retrained periodically when a new dataset is received.

In an exemplary scenario, the storage 114 can be a cloud object storage such as an S3 bucket, with capabilities such as, but not limited to, industry-leading scalability, data availability security, and performance.

The storage 114 can be a tangible device that can retain and store instructions for use by an instruction execution device. The storage 114 can be but is not limited to an electronic storage device, a magnetic storage device, an optical storage device, an electromagnetic storage device, a semiconductor storage device, or any suitable combination of the foregoing. A non-exhaustive list of more specific examples of the storage 114 includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

Figure 2:
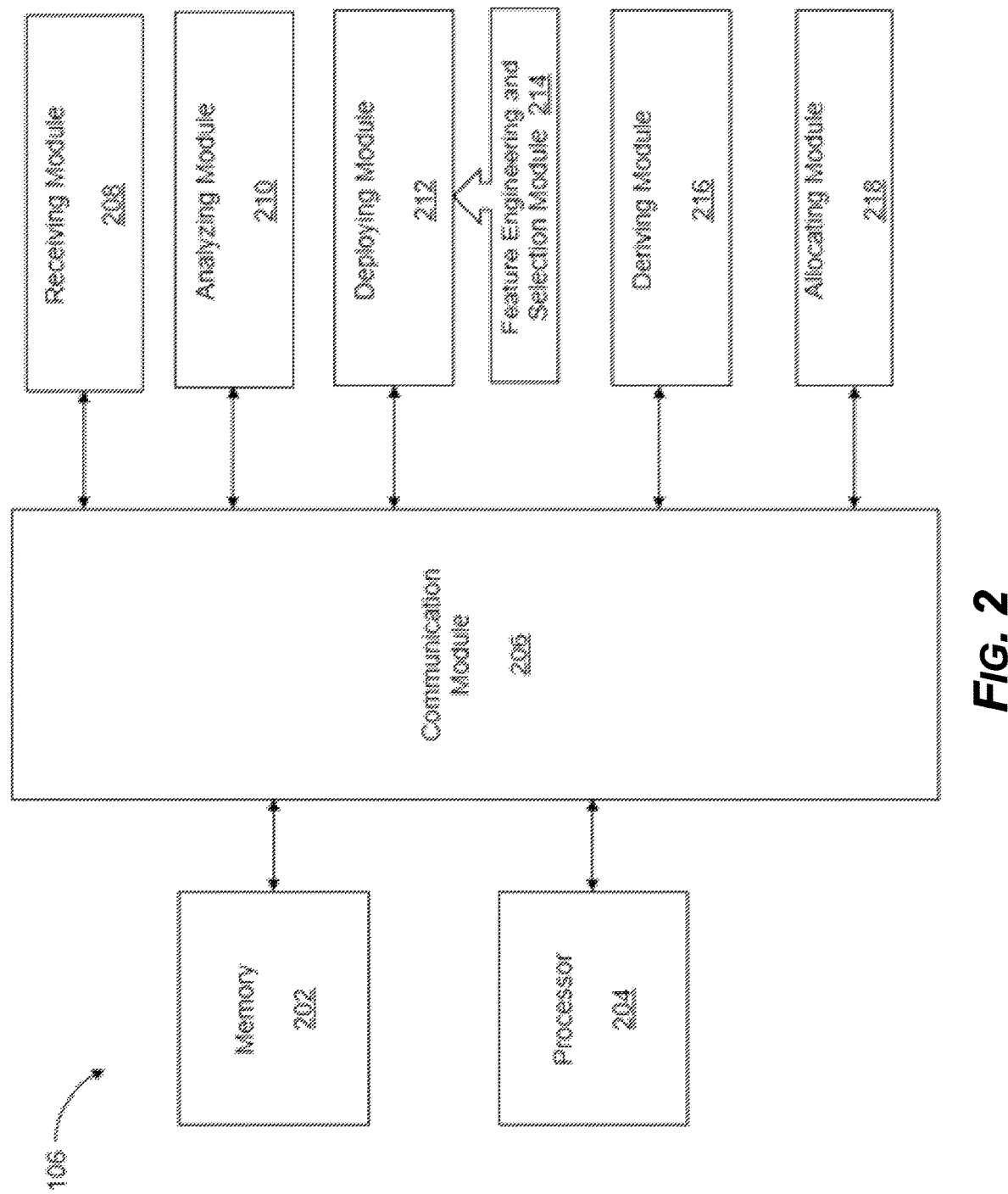
FIG. 2 illustrates a route analytics model for predicting optimal configuration parameters for a data analytics engine, in accordance with an exemplary embodiment of the invention.

FIG. 2 is a diagram that illustrates the route analytics model 106 for predicting optimal configuration parameters for the data analytics engine, in accordance with an exemplary embodiment of the invention. Referring to FIG. 2, the route analytics model 106 includes a memory 202, a processor 204, a communication module 206, a receiving module 208, an analyzing module 210, a deploying module 212, a feature engineering and selection module 214, a deriving module 216, and an allocating module 218.

The memory 202 may comprise suitable logic and/or interfaces that may be configured to store instructions (for example, the computer-readable program code) that can implement various aspects of the present invention.

The processor 204 may comprise suitable logic, interfaces, and/or code that may be configured to execute the instructions stored in the memory 202 to implement various functionalities of the route analytics model 106 in accordance with various aspects of the present invention. The processor may be further configured to communicate with multiple modules of the route analytics model 106 via the communication module 206.

The communication module 206 comprises suitable logic, interfaces, and/or code that may be configured to transmit data between modules, engines, databases, memories, and other components of the route analytics model 106 to perform the function discussed herein. The communication module 206 may include one or more communication types and utilizes various communication methods for communication with the route analytics model 106.

In accordance with an embodiment, the receiving module 208 receives a query from a user via the user device 102 to run a new job related to data analytics at the end infrastructure 112. Upon receiving the query from the user device 102, an Application Programming Interface (API) call is initiated, which puts the route analytics model 106 into action. The API call is made with a set of input JSON, which consists of, for instance, a SQL query.

The route analytics model 106 triggers and initiates the receiving module 208, which then extracts one or more input parameters from the user query. The input parameters comprise data metrics, software metrics, and hardware metrics.

The receiving module 208 also collects data metrics from a plurality of previous runs of the data analytics engine. The data metrics collected from the plurality of prior runs can be such as but are not limited to a number of rows, a number of columns, a number of numerical columns, a number of string columns, and data size, wherein the data size is derived out of combinations of the number of rows and columns. The data metrics related to the number of rows can be such as a number of rows in input data associated with the previous runs, the number of columns can be such as a number of columns in input data related to the previous runs, the number of numerical columns can be such as, a number of a numeric type of columns in input data associated with the previous runs, and the number of string columns can be such as, a number of string type columns in input data related to the previous runs.

The receiving module 208 receives software metrics from the user via the user device 102. The software metrics received by the receiving module 208 can be such as but are not limited to parallelism, a number of partitions, and runtime of a given application. Details received by the receiving module 208 related to parallelism can be such as values of parallelism set in commands by the data analytics engine, and details related to the number of partitions can be such as, the value of partition set in commands by the data analytics engine, and details related to the runtime of a given application can be such as, total runtime of jobs of the data analytics engine.

The receiving module 208 receives hardware metrics from the user via the user device 102. The hardware metrics received by the receiving module 208 can be such as but are not limited to, executor cores, memories, and drivers. Details received by the receiving module 208 related to executor cores can be a number of executor cores required for a given task. Details related to the memories can be such an amount of memory needed for the executors. Details related to the drivers can include the amount of driver memory required for the executors.

The receiving module 208 filters the input parameters using a sequence of steps such as aggregating details from the JSON to a data frame, removing unwanted and useless columns from the aggregated data frame, filtering the useless rows from the aggregated data frame, removing duplicates, and handling null and empty rows. The receiving module 208 utilizes filtering models such as, but not limited to, average filtering technique, local regression filtering technique, classification filtering technique, association filtering technique, Savitzky-Golay filtering technique, and Hamming window filtering technique for filtering the input parameters.

The analyzing module 210 performs exploratory data analysis on the filtered input parameters to understand and analyze the type of dataset present in the input parameters. The analyzing module 210 then analyzes the metadata of the input parameters to determine if the received input parameters comprise a new dataset or a continuous dataset. The continuous dataset can be an existing dataset with emerging trends in its data over a period of time.

The analyzing module 210, to determine the dataset of the input parameters, assigns an ID such as, for instance, dataset ID, which is unique for a particular dataset and remains constant forever for the particular dataset. The analyzing module 210 compares the assigned ID with a lookup table to check if it already exists. If the dataset ID is already present, then it is classified as the old dataset. If the dataset ID is not present, then a new ID is inserted into the lookup table, and this data is classified as a new dataset.

On the other hand, once the dataset is classified as the old dataset, the analyzing module 210 checks if the old dataset is showing trends in its data over a period of time and then deploys the one or more models.

In an embodiment, the analyzing module 210 employs the Mann Kendall (MK) test to determine if the old dataset shows a trend. The MK test determines whether or not a trend exists in time series data. The MK test is a non-parametric test, which indicates that there is no underlying assumption about the data's normality.

The null hypothesis for the MK test is that there is no trend, and the alternative hypothesis is that there is a trend in the two-sided test or that there is an upward trend (or downward trend) in the one-sided test.

The MK test utilizes the following test statistics $$z = \begin{cases} (S-1)/se, & S > 0 \\ 0, & S = 0 \\ (S+1)/se, & S < 0 \end{cases}$$

where se=the square root of var, if there is no monotonic trend (the null hypothesis), then for time series with more than 10 elements, $z \sim N(0, 1)$, i.e. z has a standard normal distribution.

The deploying module 212, upon determining the datasets by the analyzing module 210, deploys one or more models from the plurality of models. The one or more models can be such as, but not limited to, a Forecasting model and a Regression model.

The deploying module 212 further comprises the feature engineering, and selection model 214 is built based on various experimentation and trial results. Based on experimentation and trial results, the feature engineering and selection model 214 ensures the preparation of a valid and efficient input dataset.

The feature engineering and selection model 214 utilizes log transformation, robust scalar, and bucketing to extract features from the input parameters to prepare a valid and efficient input data set.

Log transformation is a data transformation method that replaces each variable x with a log(x). The choice of the logarithm base is usually left up to the analyst, and it depends on the purposes of statistical modeling. For the present use case, NumPy log( ) function is used, which does the natural logarithm of a value, i.e., logarithm using base 'e.'

Robust scalar scales features using statistics that are robust to outliers. This Scaler removes the median and scales the data according to the quantile range (defaults to IQR (Interquartile Range): Interquartile Range). The IQR is the range between the 1st quartile (25th quantile) and the 3$^{rd}$ quartile (75th quantile).

Bucketing is a technique of binning a continuous numeric feature into a different category. Bucketing, for instance, in an experiment is applied on the complete runtime in the range of 200 seconds (about three and a half minutes), thus getting a more evenly distributed value for this feature.

By utilizing log transformation, robust scalar, and bucketing, the feature engineering and selection model 214 builds its intelligence and assists the deploying module 212 in understanding the impact of the determined dataset and thereby selecting the one or more models to be deployed in real-time. The feature engineering and selection model 214 operates in an iterative process and continues to operate until optimal configuration parameters are obtained.

The one or more models that are deployed by the deploying module 212 in real-time, can be such as, the Forecasting Model and the Regression Model.

In accordance with an embodiment, the forecasting model, in order to predict optimal configuration parameters for the data analytics engine, splits the input parameters into training data and testing data. The training and testing data are used by SARIMAX (Seasonal Auto-Regressive Integrated Moving Average with eXogenous factor) algorithm to train the forecasting model to predict the trend in the dataset and forecast an optimum number of executor instances.

In accordance with an embodiment, the regression model, in order to predict optimal configuration parameters for the data analytics engine, splits the input parameters into training data and testing data. The training and the testing data are then used to tune hyperparameters and predict an optimum number of executor instances.

In an exemplary embodiment, the one or more models are trained using Supervised ML algorithms. The Supervised ML algorithms that are used to train the one or more models can be such as but are not limited to, a Linear Regression algorithm, a Ridge Regression algorithm an XG Boost algorithm, or a Forecasting algorithm, which can be SARIMAX (Seasonal Auto-Regressive Integrated Moving Average with eXogenous factor).

In accordance with the exemplary embodiment, the Supervised ML algorithms can also be a group of algorithms such as, but not limited to, regression and classification algorithms. Further, the regression algorithms can be such as, but are not limited to, Linear Regression, Regression Trees, Non-Linear Regression, Bayesian Linear Regression, and Polynomial Regression. Furthermore, the classification algorithms can be such as, but not limited to, Random Forest, Decision Trees, Logistic Regression, and Support Vector Machines (SVM).

In accordance with the exemplary embodiment, the chart below illustrates one or more core features that are used by the Supervised ML algorithms to train the one or more models.

| Core Feature Name | Feature Description |
| --- | --- |
| num_rows | Number of rows in input Data |
| string_cols | Number of string type columns in Data |
| numerical_cols | Number of numeric type columns in Data |
| complete_run | Total runtime of spark job |
| executor_memory | Executor memory required |
| executor_cores | Number of Executor cores required |
| executor_instances | Number of Executor cores required (to be predicted) |
| partition_count | Value of partition set in the spark-submit command |
| parallelism | Value of parallelism set in the spark-submit command |
| driver_memory | Total driver memory allocated. |
| data_size | Total Size of Data in Megabytes (derived from combination on num_rows, string_col and numerical_cols) |

The deriving module 216, upon the prediction of the number of executor instances by the deploying module 212, derives an optimum number of executor instances for a specific type of application of the data analytics engine in a given time frame. The optimum number of executor instances can be such as, but not limited to, a number of executors, executor cores, a memory of executors, driver memory, and parallelism.

In an exemplary embodiment, the executors in the data analytics engine are responsible for running the one or more tasks. The executors provide in-memory storage for Resilient Distributed Dataset (RDD) of the data analytics engine and are also configured to register themselves with drivers of the data analytics engine. The drivers of the data analytics engine comprise all the information about the executors at all the times. The executors act as worker nodes of the data analytics engine, which take charge and run individual tasks in the given job in response to the user query. The executors are triggered and launched at the start of the job execution and they typically run for the entire lifetime of the job.

The allocating module 218, upon deriving the optimum number of executor instances by the deriving module 216, allocates them for the given application of the data analytics engine. Upon allocating the optimum number of executor instances, optimal configuration parameters are built for the data analytics engine for the given application in the given time frame.

The allocating module 218 allocates the optimum number of executor instances for effective execution of scheduled jobs at the end infrastructure 112. The allocation is performed based on one or more rules to maximize resource consumption with optimal and minimal cost and faster execution.

In an exemplary embodiment, the chart illustrated below indicates the allocation of optimal configurations based on respective rules and their impacts.

| Configurations | Rules | Impact |
| --- | --- | --- |
| spark.executor.cores | Experimentally set by taking the available hardware into account | The number of cores per executor helps in the parallel execution of a job. However, too many cores per executor can lead to large memory pool and reduced garbage collection leading to slow processing. |

-continued

| Configurations | Rules | Impact |
| --- | --- | --- |
| spark.driver.memory | Experimentally set by taking the available hardware into account | The amount of memory to use for the driver process, i.e. where Spark ™ Context is initialized. Setting up too large a memory size would be a waste of resources as most of the processing is done on the executors' side, and the driver is responsible for coordination. However, the driver memory comes into play whenever a collect/pandas operation is performed. |
| spark.executor.memory | Experimentally set by taking the available hardware into account | Executor memory is dependent on the physical memory available in a node, and after taking into consideration the overhead factor and memory of the cluster manager, this is decided. |
| spark.executor.instances | $$\sqrt{\dfrac{\max(500, rows * cols * 16 * DATAMULTIPLIER)}{1024 * 1024}{PARTITIONSIZE}}$$ Where, rows = number of rows in the dataset cols = number of columns in the dataset DATAMULTIPLIER = 4 (tackling OOM) PARTITIONSIZE = 128 (block size) | Sometimes having many tiny executors has some drawbacks as it will have more JVMs running (overheads) and more copies of data if broadcast variables are used. And too few executors would not be able to utilize parallelism effectively. |
| spark.default.parallelism | 4 * spark.executor.instances | The default number of partitions in RDDs returned by transformations like join, reduceByKey, and parallelize when not set explicitly by the user. Too few partitions will not be able to utilize all the cores available in the cluster. And too many partitions will cause an excessive overhead in managing many small tasks. |
| spark.sql.shuffle.partitions | 4 * spark.executor.instances | It configures the number of partitions used when shuffling data for joins or aggregations. When dealing with a small amount of data, it should be small. Otherwise, we would end up with a substantial number of small partition files with fewer records, which will result in running many tasks with fewer data. On the other hand, having too much data and having a smaller number of partitions results in fewer longer running tasks, and sometimes you may also get out of memory error. |

Thereafter, the allocation module 218 invokes either the scheduler 108 to trigger scheduled jobs based on the user query or invokes the cluster provisioning module 110 to create, for instance, an Elastic Map Reduce (EMR) cluster (in AWS scenario) at the end infrastructure 112 where all jobs of the data analytics engine are executed.

FIG. 3 is a table 300 that illustrates experimental results representing performance of the SARIMAX model, in accordance with an exemplary embodiment of the invention.

As illustrated in FIG. 3, the experimental results shown in the table 300 represent the performance of the SARIMAX model while predicting optimal configuration parameters for the data analytics engine.

Figure 4:
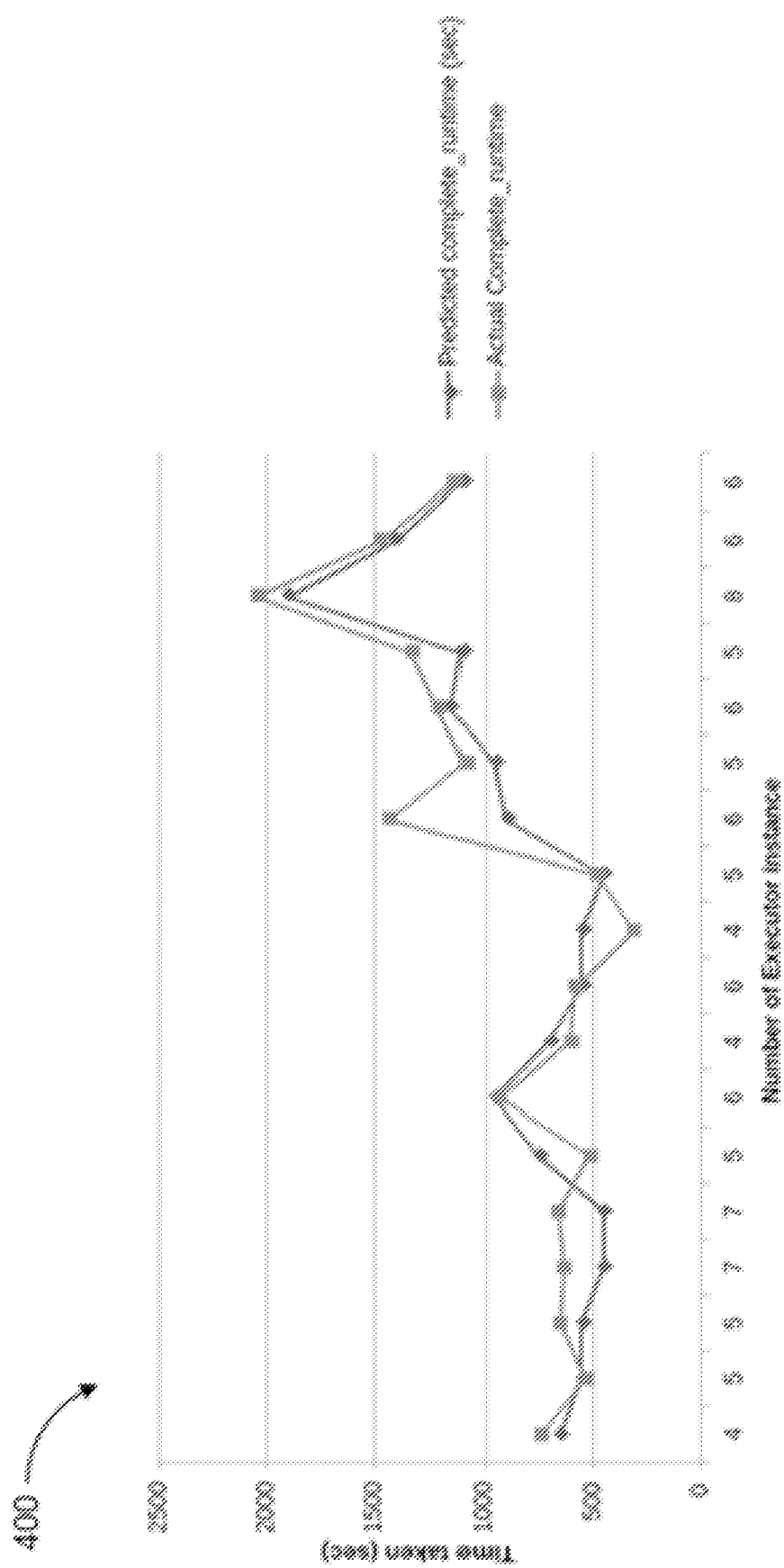
FIG. 4 is a chart that illustrates a pattern in predicting optimum executor instances, in accordance with an exemplary embodiment of the invention.

FIG. 4 is a chart 400 that illustrates a pattern in predicting optimum executor instances, in accordance with an exemplary embodiment of the invention.

As illustrated in FIG. 4, upon testing the performance and implementing the SARIMAX model in the real world, a pattern in predicting optimum executor instances with good accuracy and slight variation is observed. The chart 400 represents the amount of time (in a sec) taken for a particular number of executor instances Vs. Time.

The SARIMAX model is fed various input parameters along with the time (in seconds) in which the job is required to get completed. The SARIMAX model predicted the best possible executor instance value using all the input parameters, which can do the job in specified time periods. All these observations were taken by running the job on EMR cluster.

Figure 5:
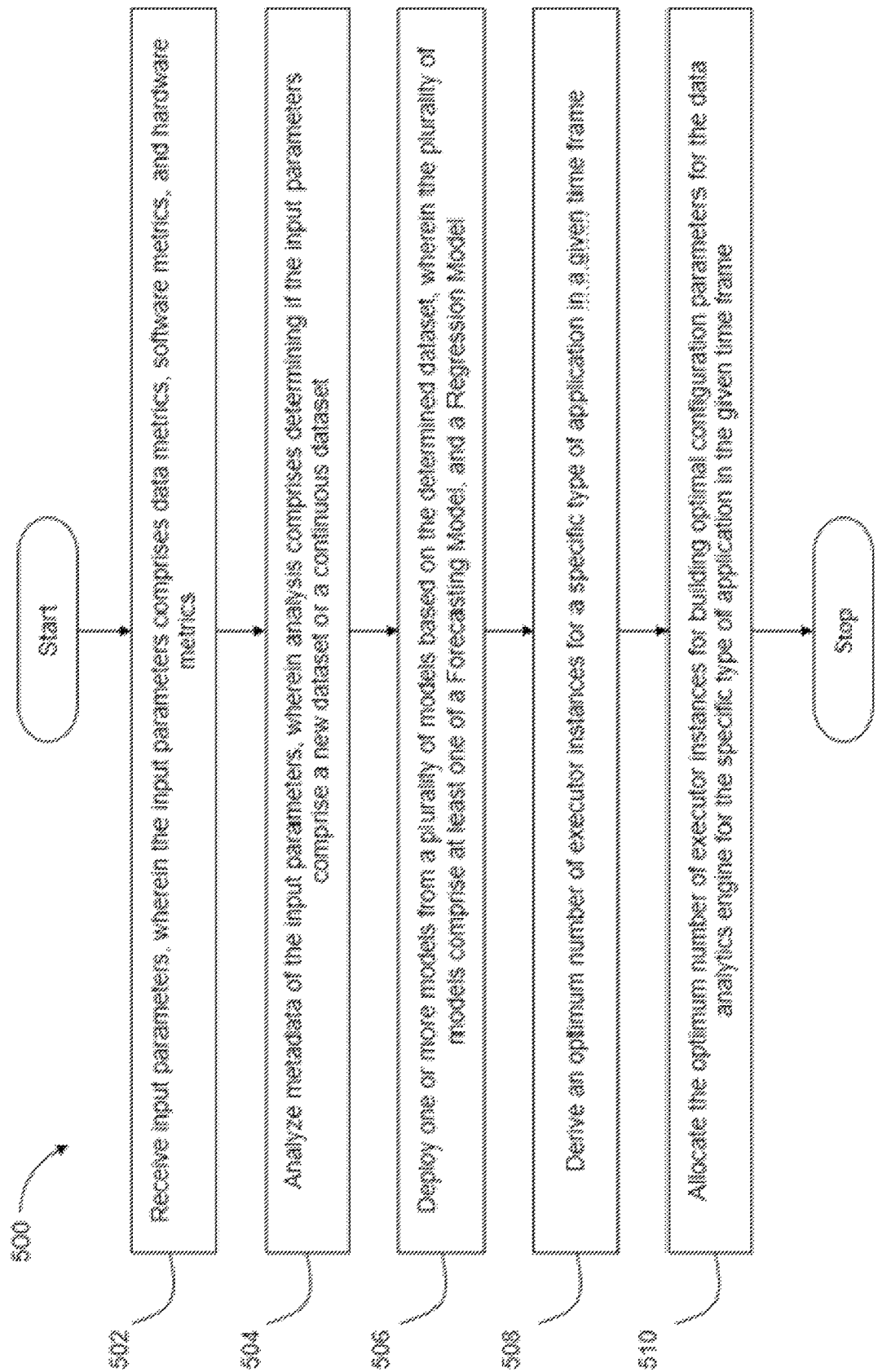
FIG. 5 is a flow chart that illustrates a method for predicting optimal configuration parameters for a data analytics engine, in accordance with an exemplary embodiment of the invention.

FIG. 5 is a flow chart 500 that illustrates a method for predicting optimal configuration parameters for the data analytics engine, in accordance with an exemplary embodiment of the invention.

At step 502, the receiving module 208 receives input parameters, wherein the input parameters include data metrics, software metrics, and hardware metrics.

The receiving module 208 receives a query from the user via the user device 102 to run a new job related to data analytics at the end infrastructure 112. Upon receiving the query from the user, an Application Programming Interface (API) call is made to the route analytics model 106 with a set of input JSON, which consists of, for instance, a SQL query.

The received query is then utilized by the route analytics model 106 to trigger and initiate the receiving module 208 to receive the input parameters.

In an embodiment, the receiving module 208 collects data metrics from a plurality of previous runs of the data analytics engine. The data metrics collected from the plurality of previous runs can be such as but are not limited to a number of rows, a number of columns, a number of numerical columns, a number of string columns, and data size.

The receiving module 208 receives software metrics from a user via a user device. The software metrics received by the receiving module 208 can be such as but are not limited to, parallelism, number of partitions, and runtime of a given application.

The receiving module 208 receives hardware metrics from the user via the user device. The hardware metrics received by the receiving module 208 can be such as but are not limited to, executor cores, memories, and drivers.

At step 504, the analyzing module 210 analyzes the metadata of the input parameters, wherein the analysis comprises determining if the input parameters include a new dataset or a continuous dataset.

In an embodiment, the continuous dataset can be an existing dataset with emerging trends in its data over a period of time.

At step 506, the deploying module 212 deploys one or more models from a plurality of models based on the determined dataset. The plurality of models includes a Forecasting Model and a Regression Model.

The deploying module 212 further comprises a feature engineering and selection module 214 that is built based on various experimentation and trial results. By utilizing its data intelligence, the feature engineering and selection module 214 assists the deploying module 212 in understanding the impact of the determined dataset and thereby selecting the one or more appropriate models to be deployed in real-time. The feature engineering and selection model 214 operates in an iterative process, and it will continue to operate until optimal configuration parameters are obtained.

In accordance with an embodiment, the forecasting model, in order to predict optimal configuration parameters for the data analytics engine, initially splits the input parameters into training data and testing data. The training and testing data are then used by SARIMAX (Seasonal Auto-Regressive Integrated Moving Average with eXogenous factor) algorithm to train the forecasting model to predict the trend in the dataset and forecast an optimum number of executor instances.

In accordance with an embodiment, the regression model, in order to predict optimal configuration parameters for the data analytics engine, initially splits the input parameters into training data and testing data. The training and testing data are then used to tune hyperparameters and predict an optimum number of executor instances.

At step 508, the deriving module 216, upon prediction of the number of executor instances by the deploying module 212, derives an optimum number of executor instances for a specific type of application in a given time frame.

The deriving module 216 then derives an optimum number of executor instances for a specific type of application of the data analytics engine in a given time frame. The optimum number of executor instances can be such as, but not limited to, a number of executors, executor cores, the memory of executors, driver memory, and parallelism.

In an exemplary embodiment, the executors in the data analytics engine are responsible for running one or more tasks. The executors provide in-memory storage for RDDs of the data analytics engine and are also configured to register themselves with drivers of the data analytics engine. The drivers of the data analytics engine include all the information about the executors at all the times. The executors act as worker nodes of the data analytics engine, which take charge and run individual tasks in the given job in response to the user query. The executors are triggered and launched at the start of the job execution and they typically run for the entire lifetime of the job.

At step 510, the allocation module 218 allocates the optimum number of executor instances for building optimal configuration parameters for the data analytics engine for the specific type of application in the given time frame.

The present invention is advantageous in that the data it collects data from multiple previous runs of a data analytics application and utilizes various supervised machine learning algorithms to predict optimal configuration parameters which would complete the job in the given timeframe. The present invention can predict the optimal configuration that would complete the job in the given time range, which in turn helps to assign the right configuration parameters without any internal cluster sizing information and removes the manual trial and error, thus saving time and cost.

Further, the present invention is targeted to provide optimal cluster configuration based on a historical run of an application, such that it can complete in a given time. Thus, predicting the optimal configuration based on the run time would allow a user to decide the optimal tradeoff between the infrastructure cost and job execution time. Thus, the present invention can further improve the system with post-processing steps and adding rules to make the model make even better decisions.

Those skilled in the art will realize that the above-recognized advantages and other advantages described herein are merely exemplary and are not meant to be a complete rendering of all of the advantages of the various embodiments of the present invention.

As described in the invention or any of its components, the system may be embodied in the form of a computing device. The computing device can be, for example, but is not limited to, the general-purpose computer, a smartphone, a programmed microprocessor, a micro-controller, a peripheral integrated circuit element, and other devices or arrangements of devices that can implement the steps that constitute the method of the invention. The computing device includes a processor, a memory, a non-volatile data storage, a display, and a user interface.

In the foregoing complete specification, specific embodiments of the present invention have been described. However, one of ordinary skill in the art appreciates that various modifications and changes can be made without departing from the scope of the present invention. Accordingly, the specification and figures are to be regarded in an illustrative rather than a restrictive sense. All such modifications are intended to be included within the scope of the present invention.

The invention claimed is:

1. A computer-implemented method for predicting optimal configuration parameters for a data analytics engine, the method comprising:
receiving, by one or more processors, input parameters, wherein the input parameters comprise data metrics, software metrics, and hardware metrics;
determining, by the one or more processors, if the input parameters correspond to a new dataset or a continuous dataset;
deploying, by the one or more processors, a time-series forecasting model to predict an optimum number of executor instances for the data analytics engine based on the input parameters corresponding to the continuous dataset;
deploying, by the one or more processors, a supervised regression model to predict the optimum number of executor instances based on the input parameters corresponding to the new dataset;
and
allocating, by the one or more processors, the predicted optimum number of executor instances for building the optimal configuration parameters for the data analytics engine for a specific type of application in a given time frame.

2. The computer-implemented method as claimed in claim 1, wherein the data metrics collected from a plurality of previous runs of the data analytics engine comprises at least one metric related to a number of rows in input data related to the plurality of previous runs, a number of columns in input data related to the plurality of previous runs, a number of numerical columns in input data related to the plurality of previous runs, a number of string columns in input data related to the plurality of previous runs, or data size that is derived out of combinations of the number of rows and columns.

3. The computer-implemented method as claimed in claim 1, wherein the software metrics comprise at least one metric related to values of parallelism set in commands by the data analytics engine, value of partition set in commands by the data analytics engine, or total runtime of jobs of the data analytics engine.

4. The computer-implemented method as claimed in claim 1, wherein the hardware metrics comprise at least one metric related to a number of executor cores required for a given task, amount of memory required for executors, or amount of driver memory that is required for the executors.

5. The computer-implemented method as claimed in claim 1, wherein the continuous dataset corresponds to an existing dataset with emerging trends over a period of time.

6. The computer-implemented method as claimed in claim 1, wherein
the supervised regression model corresponds to at least one of a Linear Regression algorithm, a Ridge Regression algorithm, or XG Boost algorithm, and
the time-series forecasting model corresponds to SARIMAX (Seasonal Auto-Regressive Integrated Moving Average with exogenous factor) model.

7. The computer-implemented method as claimed in claim 1, wherein the optimum number of executor instances that are allocated corresponds to at least one of a number of executors, executor cores, memory of executors, driver memory, or parallelism.

8. A system, comprising:
a memory;
a processor communicatively coupled to the memory, the processor configured to:
receive input parameters, wherein the input parameters comprise data metrics, software metrics, and hardware metrics;
determine if the input parameters correspond to a new dataset or a continuous dataset;
deploy a time-series forecasting model to predict an optimum number of executor instances for a data analytics engine based on the input parameters corresponding to the continuous dataset;
deploy a supervised regression model to predict the optimum number of executor instances based on the input parameters corresponding to the new dataset; and
allocate the predicted optimum number of executor instances for building optimal configuration parameters for the data analytics engine for the specific type of application in a given time frame.

9. The system as claimed in claim 8, wherein the data metrics collected from a plurality of previous runs of the data analytics engine comprises at least one metric related to a number of rows in input data related to the plurality of previous runs, a number of columns in input data related to the plurality of previous runs, a number of numerical columns in input data related to the plurality of previous runs, a number of string columns in input data related to the plurality of previous runs, or data size that is derived out of combinations of the number of rows and columns.

10. The system as claimed in claim 8, wherein the software metrics comprise at least one metric related to values of parallelism set in commands by the data analytics engine, value of partition set in commands by the data analytics engine, or total runtime of jobs of the data analytics engine.

11. The system as claimed in claim 8, wherein the hardware metrics comprise at least one metric related to a number of executor cores required for a given task, amount of memory required for executors, or amount of driver memory required for the executors.

12. The system as claimed in claim 8, wherein the continuous dataset corresponds to an existing dataset with emerging trends over a period of time.

13. The system as claimed in claim 8, wherein
the supervised regression model corresponds to at least one of a Linear Regression algorithm, a Ridge Regression algorithm or XG Boost algorithm, and the time-series forecasting model corresponds to SARI-MAX (Seasonal Auto-Regressive Integrated Moving Average with exogenous factor) model.

14. The system as claimed in claim 8, wherein the optimum number of executor instances that are allocated corresponds to at least one of a number of executors, executor cores, memory of executors, driver memory, or parallelism.

* * * * *